Patented June 3, 1952

2,599,119

UNITED STATES PATENT OFFICE 2,599,119

ETHYLENE/BUTENE-1,4-DIOIC ACID MONO-ESTER COPOLYMERS

David M. McQueen, Wilmington, Del., assignor to E. I. du Pont de Nemours & Company, Wilmington, Del., a corporation of Delaware No Drawing. Application August 18, 1950, Serial No. 180,303

8 Claims. (Cl. 260—78.5)

This invention relates to polymeric products and more particularly to new polymeric polyacids, to compositions containing them and to methods for their preparation.

It is an object of this invention to provide new polymeric products and methods for their preparation. A further object is to provide novel polymeric acids and methods for their preparation. A still further object is to provide novel polymeric acids especially useful as components of polishing compositions. Another object is to provide novel compositions containing new polymeric polyacids. Other objects will appear hereinafter.

The objects of this invention are accomplished by copolymers of ethylene with monoesters of butene-1,4-dioic acid, said copolymers containing 7 to 40 moles of ethylene per mole of butene-1,4-dioic acid monoester. As equivalents for the monoesters of butene-1,4-dioic acid there can be used monoesters of hydrocarbon substituted butene-1,4-dioic acids; these dicarboxylic acid monoesters having the general formula $HOOC-CH=C(R)-COOR'$ wherein R is hydrogen or a monovalent hydrocarbon radical free of aliphatic unsaturation containing up to 18 carbon atoms and R' is a monovalent hydrocarbon radical free of aliphatic unsaturation containing up to 20 carbon atoms. These new polymeric polyacids are made by copolymerizing ethylene with the butene-1,4-dioic acid monoester under pressure, in the presence of a compound capable of yielding unstable free radicals under the conditions of reaction, at a temperature of from 0° to 250° C.

In one method for preparing the new polymeric polyacids of this invention, a pressure reactor is charged with the butene-1,4-dioic acid monoester, a reaction medium, and a compound capable of generating unstable free radicals under the conditions of reaction employed. The reactor is cooled to 0° C., or lower, swept with oxygen-free nitrogen, and then evacuated. The reactor is pressured with ethylene to a selected pressure and the charged reactor is placed on an agitating rack fitted with heating means. Heating and agitation are then started and, after the temperature selected for reaction has been reached, the pressure is adjusted with ethylene to the desired level. Throughout the period of reaction the pressure within the reactor is maintained by periodically repressuring with ethylene or with solution of the monoester. After reaction is complete, as evidenced by cessation of pressure drop, the reactor is permitted to cool, and the contents discharged. The desired copolymer, if insoluble in the reaction medium, is isolated by filtration followed by washing and drying. If the copolymer is soluble in the reaction medium, it may be isolated by pouring the solution into water or a water-methanol mixture, and then filtering the precipitated polymer. If the product is too tacky to isolate in this manner, the reaction mixture is steamed to remove the organic solvent, leaving unreacted non-volatile butene-1,4-dioic acid monoester in the water layer. The polymer is dried by heating under reduced pressure.

The examples which follow are submitted to illustrate and not to limit this invention. Inherent viscosities were measured on 0.5% solutions in xylene at 85° C.

Example I

A pressure reactor was charged with 50 g. of methyl hydrogen maleate, 3 g. of alpha,alpha'-azodiisobutyronitrile, and 400 g. of isopropyl alcohol. The reactor was cooled to 0° C. and swept with oxygen-free nitrogen, after which it was evacuated. The charged reactor was placed on a rocker mechanism and pressured with ethylene to 700 to 1000 atms. at 80° to 86° C. The reactor was agitated and these conditions were maintained for 2 hours, during which time the pressure was held at the indicated level by periodically repressuring with ethylene. Thereafter the reactor was allowed to cool, opened, and the contents discharged. From the reaction mixture there was isolated 159 g. of a solid polymer having a melting point of 103° to 110° C. Analysis of the product indicated it to be one containing 75 weight per cent of ethylene. The acid number was 104 and the Shore hardness was 100. The calculated mole ratio of ethylene to methyl hydrogen maleate was 14:1.

Example II

Following the procedure described in Example I, but with a charge consisting of 40 grams of ethyl hydrogen maleate, 2 grams of 1,1'-azodicyclohexanecarbonitrile, and 500 grams of isopropyl alcohol at 110° to 111° C., under 840 to 990 atmospheres ethylene pressure for one hour, there was obtained 28 grams of polymer containing 65 weight per cent of ethylene and melting at 60° to 63° C. The acid number of the polymer was 129, its calculated ethylene:ethyl hydrogen maleate mole ratio 9.6:1, its Shore hardness 22, its melt viscosity 21, and its inherent viscosity 0.094.

Example III

Following the procedure described in Example I, but with a charge consisting of 30 grams of methyl hydrogen maleate, 0.4 gram of di(tert.butyl) peroxide and 400 grams of tertiary butyl alcohol at 140° C. and 700 to 975 atmospheres ethylene pressure for 2 hours, there was obtained 178 grams of polymer containing 86 weight per cent ethylene and melting at 114° to 120° C. The acid number of the polymer was 56, its Shore hardness 95, its calculated ethylene:methyl hydrogen maleate mole ratio 29:1, and its inherent viscosity 0.34.

*Example IV*

Following the procedure described in Example I, but with a charge consisting of 100 grams of octadecyl hydrogen maleate, 1.6 grams of di-(tert.butyl) peroxide and 400 grams of tertiary butyl alcohol at 125° to 147° C. and 550 to 960 atmospheres ethylene pressure for 2 hours, there was obtained 193 grams of polymer containing 62 weight per cent of ethylene and melting at 67° to 73° C. The acid number of the polymer was 56, its ethylene:octadecyl hydrogen maleate mole ratio was 21:1, its Shore hardness 59, its melt viscosity 18, and its inherent viscosity 0.14.

*Example V*

Following the procedure described in Example I, but with a charge consisting of 50 grams of methyl hydrogen maleate, 0.8 gram of di(tert.butyl) peroxide, 370 grams of tertiary butyl alcohol, and 30 grams of cyclohexane, at 130° C. and 880 to 1000 atmospheres ethylene pressure for one hour, there was obtained 80 grams of polymer containing 60 weight per cent of ethylene and melting at 90° to 97° C. The acid number was 184, its ethylene:methyl hydrogen maleate mole ratio was 7:1, and its Shore hardness 85.

*Example VI*

Following the procedure described in Example I, but with a charge consisting of 50 grams of methyl hydrogen maleate, 1.2 grams of di-(tert.butyl) peroxide, 340 grams of tertiary butyl alcohol, and 60 grams of isopropyl alcohol, at 127° to 143° C. and 600 to 900 atmospheres ethylene pressure, there was obtained 110 grams of polymer containing 76 weight per cent of ethylene and melting at 87° to 93° C. The acid number of the polymer was 106, its ethylene:methyl hydrogen maleate mole ratio 15:1, its Shore hardness 83, its melt viscosity 153, and its inherent viscosity 0.13.

*Example VII*

Following the procedure described in Example I, but with a charge consisting of 50 grams of methyl hydrogen maleate, 1.2 grams of di-(tert.butyl) peroxide and 340 grams of tertiary butyl alcohol at 130° to 141° C. and 800 to 990 atmospheres ethylene pressure for one hour, there was obtained 92 grams of polymer melting at 93° to 97° C. The polymer contained 70 weight per cent of ethylene and an ethylene:methyl hydrogen maleate mole ratio of 11:1. Its acid number was 134, its Shore hardness 86, its melt viscosity 201, and its inherent viscosity 0.14.

*Example VIII*

Following the procedure described in Example I, but with a charge consisting of 50 grams of ethyl hydrogen maleate, 1.2 grams of di(tert.butyl) peroxide and 340 grams of tertiary butyl alcohol at 130° to 144° C. and 600 to 1000 atmospheres ethylene pressure for one hour, there was obtained 153 grams of polymer melting at 83° to 87° C. The polymer contained 78 weight per cent of ethylene, its ethylene:ethyl hydrogen maleate mole ratio was 19:1, its acid number was 86, its Shore hardness was 84, its melt viscosity 219, and its inherent viscosity 0.16.

*Example IX*

A solution of 10 grams of butyl hydrogen maleate, 100 grams of tertiary butyl alcohol and 0.15 gram of 1,1'-azodicyclohexanecarbonitrile was charged into a pressure reactor, and pressured with ethylene to between 910 and 990 atmospheres at 93° to 95° C. These conditions were maintained for 5 hours, during which time the pressure was maintained at the indicated level by periodically repressuring with ethylene. Thereafter the reactor was permitted to cool, vented, and the contents discharged. The product was a mushy gel which was steamed and milled dry. The yield was 20 grams. Analysis of the product showed it to contain 15.48% oxygen, which corresponds to 41.6% butyl hydrogen maleate and 58.4% ethylene and to an ethylene:butyl hydrogen maleate mole ratio of 8.6:1. The inherent viscosity of the product was 0.26. Films pressed at 120° C. were clear, tacky, and rubbery.

The methyl and ethyl hydrogen maleates used in the examples were made by warming maleic anhydride with a 10% excess of the alcohol on a steam bath until solution was complete and an exothermic reaction had set in. The octadecyl hydrogen maleate was made similarly, except that a 5% excess of the alcohol was used. After reaction had subsided, heating was continued for about 15 minutes longer.

In the preparation of the polymeric polyacids of this invention there can be used any monoester of butene-1,4-dioic acid or monoester of a hydrocarbon substituted butene-1,4-dioic acid conforming to the general formula:

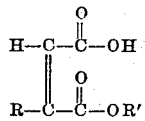

in which R is hydrogen or a monovalent hydrocarbon radical containing up to 18 carbon atoms, such as, alkyl, aryl, cycloalkyl, or aralkyl groups, e. g., methyl, ethyl, propyl, octyl, decyl, phenyl, tolyl, xylyl, benzyl, cyclohexyl, methylcyclohexyl, and the like and R' is a monovalent hydrocarbon radical containing up to 20 carbon atoms, such as, methyl, ethyl, propyl, octyl, dodecyl, octadecyl, eicosyl, benzyl, menthyl, cyclohexyl, and the like.

The preferred monoesters because of their availability and ease of preparation are those of maleic and fumaric acids, and of these the most useful from practical considerations are the alkyl hydrogen maleates and fumarates such as methyl, ethyl, amyl, octyl, dodecyl, and octadecyl hydrogen maleates and fumarates.

Although the polymeric polyacids of this invention can be made in the absence of a solvent or diluent, the use of such solvents or diluents constitutes the preferred practice because better control of the reaction is obtained thereby. The most useful solvents are those which are capable of functioning as chain transfer agents. The alcohols constitute an especially useful class of chain transfer agents. Examples of alcohols usefully employable are methyl, ethyl, propyl, isopropyl, butyl and amyl alcohols, dodecanol, octadecanol, cyclohexanol, benzyl alcohol, and the like. Alcohols containing up to 4 carbon atoms, and especially isopropyl alcohol constitute the preferred group of reaction media because of their effectiveness as chain transfer agents.

In the preparation of the products of this invention, there can be used as a catalyst any compound capable of yielding unstable free radicals under the conditions of reaction. Examples of such compounds are azo compounds of the type disclosed in U. S. Patent 2,471,959, such as, alpha,alpha' - azobis - (alpha,gamma - dimethylvaleronitrile), and dimethyl and diethyl alpha,-alpha' - azodiisobutyrate, 1,1'-azodicyclohexanecarbonitrile, etc., azines, oximes, amine oxides, peroxy compounds such as organic peroxides, peroxy salts, hydroperoxides, percarboxylates, etc. Examples of such compounds are benzoyl peroxide, diethyl peroxide, tertiary butyl pentamethylpropyl peroxide, di(tert.-butyl)peroxide, sodium, potassium, and ammonium persulfates, tertiary butyl hydroperoxide, ethyl hydroperoxide, benzalazine, diphenyl ketazine, hydrazine hydrochloride, acetoxime, camphor oxime, trimethylamine oxide, etc. Combinations of two or more of these catalysts can be used if desired as can also combinations of the per compounds with a reducing agent.

The concentration of catalyst can be varied over a wide range, for example, within the range of 0.1 to 15% by weight of the monoester of the butene-1,4-dioic acid. As a rule amounts of the order of 1 to 6% by weight of the monoester of the butene-1,4-dioic acid are used because products of the desired molecular weight range are thereby obtained in good yields at practical rates of reaction.

In the preparation of the polymeric polyacids, pressures ranging from slightly above atmospheric up to 3000 atmospheres and above can be used. Generally, however, pressures of from 600 to 1500 atmospheres are used because this combines a proper balance of simplicity of equipment and good reaction rate.

The polymerization of the ethylene with the monoester of the butene-1,4-dioic acid can be effected at temperatures ranging from 0° to 250° C. Because good reaction rates and yields of desired product are obtained at temperatures of from 80° to 150° C., this constitutes the preferred operating temperature range.

The polymeric polyacids of this invention contain from 7 to 40 moles of ethylene per mole of butene-1,4-dioic acid monoester. Of these products the most useful are those whose inherent viscosities range from 0.05 to 0.35.

The products of this invention are useful in a diversity of applications, such as slip agents for regenerated cellulose film, anti-abrasion agents in photographic emulsions, insolubilizing agents for dyes, intermediates for chlorosulfonation, water-repellents, plumping agents and lacquer finishes for leather, carbon paper ink, hair curling agents, binders for ceramic finishes on glass, detergents for non-aqueous systems, water-repellents for fabrics pre-treated with polyamines, etc. They are particularly useful as components of wax dispersions. This use is exemplified below.

A 20% dispersion was prepared by melting together 7.5 grams of the polymeric polyacid of Example VI, 2.5 grams of microcrystalline paraffin wax melting at 91° to 93° C. adding to the blend 2.3 grams of morpholine, and then adding water slowly with stirring. Films of the dispersion cast on glass plates were clear and glossy.

Although in the above preparation the morpholine salt has been used, it is to be understood that in place thereof there can be used ammonia or any other basic amine such as pyridine, quinoline, propylamine, di-n-butylamine, di-2-ethylhexylamine, alkanolamines, e. g. mono-, di-, and triethanolamines, dimethylaminoethanol, aminoethylethanolamine, triisopropanolamine, etc.

The polymeric polyacids are especially useful as components of polishing waxes of the emulsion type to improve the scuff resistance, gloss, and water-spotting resistance of films cast from such emulsions. These properties can be further improved by subjecting the polymeric polyacid to a partial hydrolysis treatment prior to incorporation into the wax emulsion composition.

The leveling properties of such wax emulsions can be improved by including a water-soluble alcohol in the composition. Ethyl, isopropyl, isobutyl, and tertiary butyl alcohols are especially useful for this purpose.

As many apparently widely different embodiments of this invention may be made without departing from the spirit and scope thereof, it is to be understood that this invention is not limited to the specific embodiments thereof except as defined in the appended claims.

I claim:

1. A copolymer consisting of ethylene with a dicarboxylic acid monoester having the general formula HOOC—CH=C(R)—COOR' wherein R is selected from the class consisting of hydrogen and monovalent hydrocarbon radicals free of aliphatic unsaturation containing up to 18 carbon atoms and R' is a monovalent hydrocarbon radical free of aliphatic unsaturation containing up to 20 carbon atoms, said copolymer containing from 7 to 40 moles of ethylene per mole of said dicarboxylic acid monoester.

2. A copolymer as set forth in claim 1 wherein R is hydrogen.

3. An amine salt of a copolymer as set forth in claim 1.

4. A copolymer consisting of ethylene with an alkyl hydrogen maleate in which the alkyl group contains from 1 to 20 carbon atoms, said copolymer containing from 7 to 40 moles of ethylene per mole of alkyl hydrogen maleate.

5. A copolymer consisting of ethylene with methyl hydrogen maleate, said copolymer containing from 7 to 40 moles of ethylene per mole of methyl hydrogen maleate.

6. A copolymer consisting of ethylene with ethyl hydrogen maleate, said copolymer containing from 7 to 40 moles of ethylene per mole of ethyl hydrogen maleate.

7. A copolymer consisting of ethylene with butyl hydrogen maleate, said copolymer containing from 7 to 40 moles of ethylene per mole of butyl hydrogen maleate.

8. A copolymer consisting of ethylene with octadecyl hydrogen maleate, said copolymer containing from 7 to 40 moles of ethylene per mole of octadecyl hydrogen maleate.

DAVID M. McQUEEN.

REFERENCES CITED

The following references are of record in the file of this patent:

UNITED STATES PATENTS

| Number | Name | Date |
|---|---|---|
| 2,399,084 | Watson | Apr. 23, 1946 |
| 2,456,177 | Cuprey | Dec. 14, 1948 |
| 2,467,234 | Sargent et al. | Apr. 12, 1949 |
| 2,537,020 | Barrett | Jan. 9, 1951 |